Dec. 7, 1954   W. E. GREEN   2,696,414
SEALING RING CONSTRUCTION
Filed Jan. 27, 1951

INVENTOR:
WILLARD E. GREEN
BY Charles F. Osgood,
ATTORNEY

United States Patent Office 2,696,414
Patented Dec. 7, 1954

2,696,414
SEALING RING CONSTRUCTION

Willard E. Green, Michigan City, Ind., assignor to Joy Manufacturing Company, Pittsburgh, Pa., a corporation of Pennsylvania Application January 27, 1951, Serial No. 208,150

11 Claims. (Cl. 309—29)

This invention relates to sealing rings and more particularly, but not exclusively, to a sealing ring structure especially designed for use with the piston of a reciprocating type fluid compressor.

In certain known types of non-lubricated sealing rings, the ring elements per se have been made up in cooperating segments which are sometimes composed of carbon, and spring means act on the ring segments radially to expand the ring to provide a suitable seal and to compensate for wear. In such sealing ring structures it is highly desirable to prevent complete wearing out of the ring segments with the resultant possibility of contact of the springs or other metallic parts with the walls of the cylinder bore, thereby to eliminate the possibility of scoring of the cylinder walls. The present invention contemplates improvements over such known types of expansible segmental sealing rings in that novel means is provided which cooperates with the ring segments positively to limit expansion of the ring so that when the ring segments have worn to a predetermined degree further expansion of the ring is precluded.

An object of the present invention is to provide an improved segmental expansible type sealing ring which has improved means for expanding the ring as wear occurs together with improved means for limiting expansion of the ring when the latter has become worn to a predetermined degree. A further object is to provide an improved expansible segmental sealing ring or packing of the gapless type whereby the ring may effect proper sealing without the use of auxiliary parts such as a backing strip. A still further object is to provide an improved segmental expansible sealing ring of the non-lubricated, carbon type. These and other objects and advantages of the invention will, however, hereinafter more fully appear in the course of the ensuing description.

In the accompanying drawing there is shown for purposes of illustration one form which the invention may assume in practice.

Figure 1:
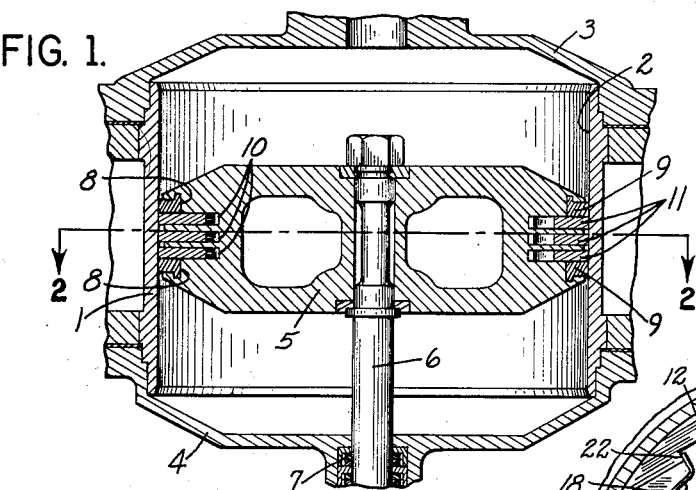
Fig. 1 is a central longitudinal section taken through a fluid compressor with which an illustrative form of the invention is associated, and showing the improved sealing rings assembled on the piston.

In this illustrative embodiment of the invention, as shown in the drawing, the improved sealing ring construction is associated with a fluid compressor which comprises a cylinder 1 having a bore 2 closed by end heads 3 and 4, and containing a reciprocable piston 5. The piston has a piston rod 6 which extends outwardly from the head 4 through a suitable packing 7. The ring structure is carried by the piston 5 and sealingly engages the walls of the cylinder bore. Evidently, the sealing ring structure may be of the contractible type and may be used for other purposes and with mechanisms other than fluid compressors.

The piston 5 has circumferentially extending, relatively wide, end grooves 8 on its exterior periphery for receiving segmental wear or bull rings 9 which slidingly engage the cylinder walls and which serve to center the piston within the cylinder, thereby to prevent contact of the piston body with the cylinder walls. Arranged on the piston exterior intermediate the wide end grooves 8 is a series of relatively deep, narrow, circumferentially extending grooves 10 for receiving expansible segmental piston or sealing rings 11 which serve sealingly to engage the walls of the cylinder bore to prevent leakage of fluid past the piston. The bull rings 9 are desirably interlocked with the piston and are held in position on the piston within the grooves 8 by the outer sealing rings 11, in the manner fully disclosed in my copending application, Serial No. 208,149, filed January 27, 1951.

Figure 3:
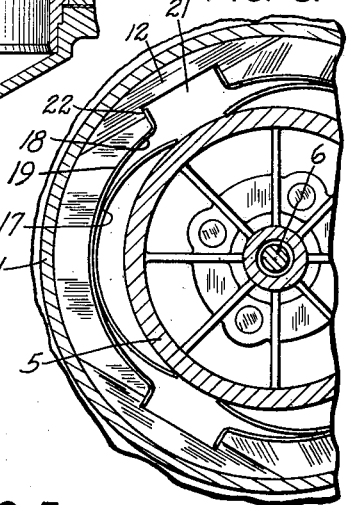
Fig. 3 is a fragmentary sectional view, similar to Fig. 2, showing the sealing ring in a predetermined worn condition with the ring segments locked against further expansion.
Figure 4:
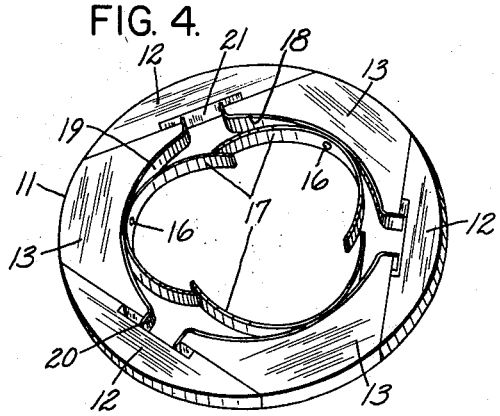
Fig. 4 is a perspective view of the improved sealing ring showing the same in fully contracted position.
Figure 5:
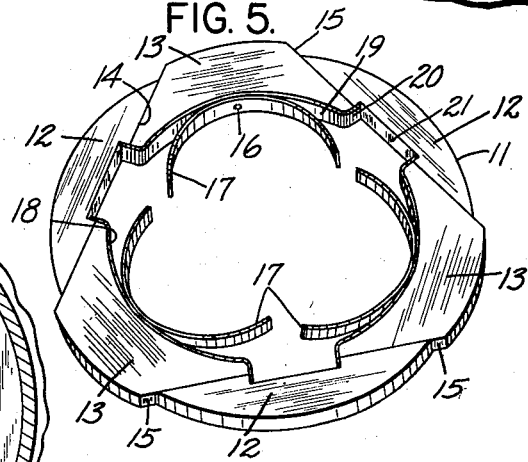
Fig. 5 is a view similar to Fig. 4, showing the ring of Fig. 4 in a fully expanded free state.
Figure 2:
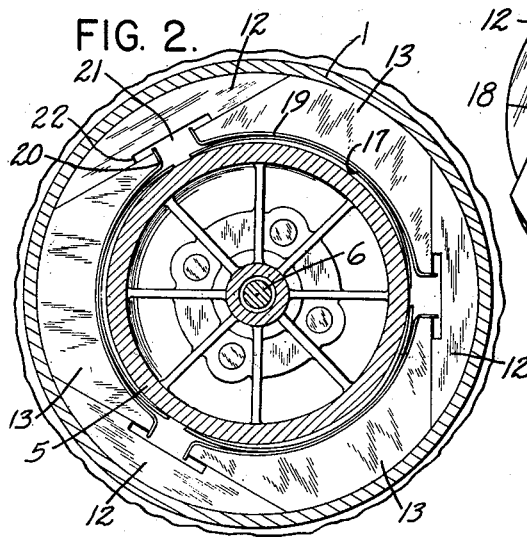
Fig. 2 is a cross section taken on line 2—2 of Fig. 1, showing the expansible sealing ring in its new or unworn condition.

Now referring to the improved structure of each of the expansible sealing rings 11, it will be noted that the same is made up of six cooperating segments which are desirably composed of carbon. The three arcuate segments are designated 12 and the three intermediate wedge segments are designated 13, and the arcuate segments 12 have chordal inner surfaces 14 while the wedge segments 13 have relatively inclined side wedging-surfaces 15 which slidingly engage the surfaces 14, in the manner shown. The six segments cooperate to form a complete ring with lapless joints, and secured at 16 to each of the wedge segments 13 is a bowed or otherwise formed spring 17, which engage the bottoms of the grooves in which the rings are received and which act yieldingly to urge the six segments outwardly to expand the ring into tight sealing contact with the walls of the cylinder bore. As wear occurs, the ring continues to expand to maintain an adequate seal, in an obvious manner. Arranged between the springs and each of the wedge segments, and bent to conform to the curved inner surfaces 18 of the wedge segments, are arcuate metallic backing strips 19 provided with suitable bent ends 20 which lie over the ends of the wedge segments. These bent ends of the backing strips project into rectangular recesses 21 formed in the inner chordal sides of the arcuate segments 12, thereby to provide stops. As each of the sealing rings wear during operation of the compressor, the six ring segments are spread radially outwardly or are expanded to maintain the seal with the bore-walls, and when the ring is worn to a predetermined degree, as shown in Fig. 3, the bent ends or stop portions 20 of the backing strips engage the end walls 22 of the recess 21, in the manner shown, positively to limit further expanding movement of the segments thereby to prevent complete wearing out of the ring with the possibility of contact of the backing strip or springs with the walls of the cylinder bore. Thus, the amount of wear of the expansible rings is definitely limited.

As a result of this invention an improved expansible segmental sealing ring structure is provided whereby the cooperating ring segments are continuously urged outwardly toward fully expanded position, and, when wear to a predetermined degree occurs, further expansion of the ring is precluded. By the provision of the backing strips which provide stops for limiting expansion of the ring segments, the possibility of the rings becoming completely worn so that the springs or other metallic parts might contact the cylinder walls, with possible resultant damage, is prevented. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a sealing ring construction, an expansible sealing ring composed of cooperating ring segments providing in all expanded working positions to which they attain by reason of wear a completely annular peripheral surface and which are adapted to be expanded into gapless sealing contact with a cylindrical surface to be sealed, certain of said segments being wedge-shaped and cooperating with alternate chordal segments, resilient means for continuously yieldingly urging said wedge-shaped segments radially outwardly to move all of said ring segments toward fully expanded position thereby to compensate for wear of the sealing surface of said ring and to maintain the seal, and stop elements carried by said wedge-shaped segments and having interlocking relation with said chordal segments, said stop elements when said ring segments are in predetermined fully expanded position as the result of wear of said ring positively limiting further expansion of said ring segments.

2. A sealing ring construction of the character set forth in claim 1 wherein said chordal segments are recessed at their inner surfaces to provide spaced abutment surfaces and said stop elements for limiting expansion of the ring includes stop elements secured to the inner surfaces of said wedge-shaped segments and having stop portions projecting into said recesses and engageable with said abutment surfaces on said chordal segments.

3. In a sealing ring construction, an expansible sealing ring composed of cooperating ring segments which are adapted to be expanded to provide in all expanded working positions to which they attain by reason of wear a completely annular gapless sealing surface engageable with a cylindrical surface to be sealed, said segments including arcuate segments and intermediate wedge segments having relatively inclined wedging surfaces, said arcuate segments having chordal surfaces engageable with said relatively inclined wedging surfaces of said wedge segments, resilient means secured to said wedge segments for continuously yieldingly urging said segments radially toward fully expanded position thereby to compensate for wear and to maintain the seal, and stop elements secured to said wedge segments and engageable with abutment surfaces on said arcuate segments for positively limiting expansion of said segments when predetermined wear of the ring occurs, said arcuate segments having recesses extending inwardly of said chordal surfaces, each recess providing spaced abutment surfaces, said stop elements extending into said recesses and engageable with said abutment surfaces, a pair of said stop elements having stop portions disposed in each recess.

4. In a sealing ring construction, an expansible sealing ring composed of cooperating ring segments which are adapted to be expanded to provide a gapless sealing surface engageable with a cylindrical surface to be sealed, said segments including arcuate segments having chordal inner surfaces and intermediate wedge segments having curved inner surfaces and relatively inclined side wedging surfaces, said arcuate segments having their chordal inner surfaces recessed to provide spaced abutments, arcuate backing strips secured to said wedge segments and lying against said curved inner surfaces of said wedge segments, said backing strips having bent ends projecting into said recesses of said arcuate segments, and springs secured to said wedge segments for yieldingly expanding said ring into sealing position and to compensate for wear of said ring, said bent ends of said backing strips engaging said spaced abutments provided by said recesses positively to limit expansion of said ring when the latter has become worn a predetermined amount.

5. In a sealing ring construction, an expansible segmental sealing ring including cooperating ring segments providing in all expanded working positions to which they attain by reason of wear a completely annular peripheral ring surface movable radially into sealing contact with a cylindrical surface to be sealed, said ring segments comprising alternate wedge-shaped and chordal segments, said chordal segments each providing spaced abutment surfaces, resilient means coacting with said wedge-shaped segments for yieldingly urging all of said segments toward such sealing position, and stop elements carried by said wedge-shaped segments and engageable with said abutment surfaces on said chordal segments for positively limiting radial movement of said segments when said ring has become worn a predetermined amount.

6. In a sealing ring construction, an expansible sealing ring composed of cooperating ring segments which are adapted to be expanded to provide a gapless sealing surface engageable with a cylindrical surface to be sealed, said segments including arcuate segments and intermediate wedge segments, said wedge segments having curved inner surfaces and relatively inclined side wedging surfaces, said arcuate segments having sliding contact with said wedging surfaces, and curved strips secured to said wedge segments and lying against said curved inner surfaces of said wedge segments, said strips having angular end portions engageable with abutment surfaces on said arcuate segments for limiting expansion of said ring, and resilient means acting on said wedge segments for yieldingly expanding said ring toward sealing engagement with said cylindrical surface to be sealed.

7. A sealing ring construction as set forth in claim 6 wherein said resilient expanding means comprises bowed leaf springs, one secured to each of said wedge segments at a point intermediate the ends of each of said curved strips.

8. A sealing ring construction as set forth in claim 5 wherein the inner surfaces of said chordal segments are recessed to provide said spaced abutments and said stop elements which are secured to said wedge-shaped segments and have portions projecting into said recesses into positions wherein they engage said abutment surfaces when said ring has become worn said predetermined amount.

9. In a sealing ring construction, a segmental sealing ring including cooperating ring segments providing in all expanded working positions to which they attain by reason of wear a completely annular peripheral surface movable radially into sealing contact with a cylindrical surface to be sealed, certain of said segments being wedge-shaped and alternating with chordal segments, said chordal segments each providing a pair of spaced abutment surfaces, resilient means for yieldingly urging said segments toward such sealing position, and stop elements on said wedge-shaped segments and having portions engaging abutment surfaces on said chordal segments thereby to interlock said segments together, said stop elements upon engagement of said portions thereof with said abutment surfaces positively limiting radial movement of said segments to a predetermined amount.

10. In a sealing ring construction, an expansible sealing ring composed of cooperating ring segments which are expandable to provide in all expanded working positions to which they attain by reason of wear a completely annular gapless sealing surface engageable with a cylindrical surface to be sealed, said segments including arcuate segments and intermediate wedge segments, said wedge segments having relatively inclined wedging surfaces with which said arcuate segments have sliding contact, separate springs respectively engaging said wedge segments and equally spaced apart internally of said ring, said springs acting against an internal extraneous circular supporting surface for concurrently urging said wedge segments outwardly to effect expansion of said ring, and locking strips engaging said wedge segments and with which said springs respectively coact for limiting the expansive movement of the ring, said strips having bent ends and said arcuate segments providing abutment surfaces with which said bent ends engage in the fully expanded position of the ring.

11. In a sealing ring construction, an expansible sealing ring composed of cooperating ring segments which are adapted to be expanded to provide a gapless sealing surface engageable with a cylindrical surface to be sealed, said segments including arcuate segments and intermediate wedge segments, said wedge segments having relatively inclined wedging surfaces with which said arcuate segments have sliding contact, bowed leaf springs acting on said wedge segments and acting against an extraneous supporting surface for urging said wedge segments outwardly to effect expansion of said ring, and curved locking stops secured to said wedge segments and having angular end portions engageable with abutment surfaces on said arcuate segments for positively limiting expansion of said ring, and said bowed leaf springs respectively engaging said curved locking stops.

References Cited in the file of this patent

UNITED STATES PATENTS

| Number | Name | Date |
| --- | --- | --- |
| 332,433 | Pflaum | Dec. 15, 1885 |
| 890,103 | Sullivan | June 9, 1908 |
| 971,978 | Dittrich | Oct. 4, 1910 |
| 2,055,153 | Madsen | Sept. 22, 1936 |
| 2,495,793 | Webb | Jan. 31, 1950 |
| 2,531,296 | Rodoliakis | Nov. 21, 1950 |

FOREIGN PATENTS

| Number | Country | Date |
| --- | --- | --- |
| 471,119 | Germany | Jan. 17, 1929 |